(12) United States Patent
Zimmer et al.

(10) Patent No.: US 12,128,519 B2
(45) Date of Patent: Oct. 29, 2024

(54) TRANSFER DEVICE OF A TRANSPORT SYSTEM

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

(*) Notice: Subject to any disclaimer, the term of this patent is extended or adjusted under 35 U.S.C. 154(b) by 572 days.

(21) Appl. No.: 17/600,973

(22) PCT Filed: Apr. 1, 2020

(86) PCT No.: PCT/DE2020/000070
§ 371 (c)(1),
(2) Date: Nov. 30, 2021

(87) PCT Pub. No.: WO2020/200344
PCT Pub. Date: Oct. 8, 2020

(65) Prior Publication Data
US 2022/0176507 A1 Jun. 9, 2022

(30) Foreign Application Priority Data
Apr. 3, 2019 (DE) ...................... 10 2019 002 424.9

(51) Int. Cl.
*B65G 54/02* (2006.01)
*B23Q 1/54* (2006.01)
(Continued)

(52) U.S. Cl.
CPC ............. *B23Q 7/16* (2013.01); *B23Q 1/5462* (2013.01); *B23Q 7/1436* (2013.01); *B65G 47/901* (2013.01)

(58) Field of Classification Search
CPC ...... B65G 35/06; B65G 47/901; B65G 54/02; B61B 13/04; B23Q 1/5462; B23Q 7/1436; B23Q 7/16
(Continued)

(56) References Cited

U.S. PATENT DOCUMENTS 4,928,806 A 5/1990 Anderson et al.
5,706,568 A * 1/1998 Nenadic ............... B23Q 11/006
451/274

(Continued)

FOREIGN PATENT DOCUMENTS

CH 677784 6/1991
CN 103459276 A 12/2013
(Continued)

*Primary Examiner* — Douglas A Hess
(74) *Attorney, Agent, or Firm* — Smartpat PLC (57) ABSTRACT

A transfer device for self-propelling workpiece trolleys of a transport system allows ends of one or more route sections to be continuously or intermittently connected. The ends of the route sections are either connected via transfer sections that are rigid and bent at least in sections, or a transfer section—which can be moved along a straight or curved track curve and supporting one or more workpiece trolleys—can be temporarily arranged before the ends of the route sections, which transfer section can be moved back and forth between the ends via a driveable gear unit. At least one transfer device for a transport and/or processing system is developed, with which the workpiece trolleys are transferred from one route section to another.

11 Claims, 11 Drawing Sheets

(51) Int. Cl.
  *B23Q 7/14* (2006.01)
  *B23Q 7/16* (2006.01)
  *B65G 35/06* (2006.01)
  *B65G 47/90* (2006.01)

(58) Field of Classification Search
  USPC .......................................... 198/346.1, 690.1
  See application file for complete search history.

(56) References Cited

U.S. PATENT DOCUMENTS

| | | | |
|---|---|---|---|
| 9,292,018 B2 * | 3/2016 | Hanaka | G05D 1/0259 |
| 9,376,271 B2 * | 6/2016 | Fujio | B65G 21/22 |
| 10,873,000 B2 * | 12/2020 | Spotti | H01L 31/1876 |
| 10,934,099 B2 * | 3/2021 | Wireman | B65G 54/02 |
| 11,643,120 B2 * | 5/2023 | Cooper | G05B 19/4189 |
| | | | 701/19 |
| 2013/0213769 A1 | 8/2013 | Plakolm | |
| 2014/0021016 A1 | 1/2014 | Schulakow et al. | |
| 2018/0043489 A1 | 2/2018 | Suzuki | |
| 2019/0047799 A1 | 2/2019 | Spotti | |
| 2019/0135548 A1 | 5/2019 | Zembutsu | |

FOREIGN PATENT DOCUMENTS

| | | | | |
|---|---|---|---|---|
| CN | 104773505 A | | 7/2015 | |
| CN | 207293476 U | | 5/2018 | |
| CN | 109071120 A | | 12/2018 | |
| CN | 110337413 | * | 10/2019 | |
| DE | 8803290 U1 | | 4/1988 | |
| DE | 3713155 A1 | | 11/1988 | |
| DE | 102017012077 A1 | | 7/2018 | |
| EP | 3260397 B1 | | 9/2021 | |
| JP | S60213458 A | | 10/1985 | |
| JP | 2002362732 A | | 12/2002 | |
| WO | 2012037592 A1 | | 3/2012 | |
| WO | 2018121808 A1 | | 7/2018 | |
| WO | WO-2018148770 A1 | * | 8/2018 | ......... B23Q 17/2208 |

* cited by examiner

TRANSFER DEVICE OF A TRANSPORT SYSTEM

TECHNICAL FIELD

The disclosure relates to a transfer device for self-propelling workpiece trolleys of a transport system, in which the ends of one or more route sections can be continuously or intermittently connected.

BACKGROUND

DE 10 2017 012 077.3 discloses a transport system with self-propelling workpiece trolleys for transporting plate-like and/or board-like workpieces in front of processing machines in a machining station. In addition to the workpiece trolleys, the transport system comprises two parallel transport rails, each of which ends in front of horizontally positioned turntables. The workpiece trolleys are transferred from one transport rail to the other using the turntables.

SUMMARY

The present disclosure provides at least one transfer device for a transport and/or processing system, with which workpiece trolleys can be transferred from one route section to another.

The ends of the route sections are either connected via transfer sections that are rigid and bent at least in sections, or a transfer section—which can be moved along a straight or curved path and supporting one or more workpiece trolleys—can be temporarily arranged before the ends of the route sections, which transfer section can be moved back and forth between the ends via a driveable gear unit.

Route and transfer sections are used, among other things, in transport systems of piece goods sorting plants or machining stations. Such a machining station is, for example, a universal machine for the cutting and/or chipless machining of, for example, furniture parts. In this process, the furniture parts, which usually have a large surface area, are fed to the machine core region via a separate transport system, where they are provided with bores, recesses, indentations, grooves, notches, chamfers or the like. At the same time, dowels can be set and fittings can be handled and installed in the machine, for example. The workpieces, that is, furniture parts or their semi-finished products, can also be inspected or measured prior to and/or after machining, for example with regard to their geometry.

For this purpose, the machining station is set up in such a manner that it can process a wide variety of workpieces one after the other without retooling. For this purpose, the plate-like and/or board-like workpieces are transported along an elongated, for example rectilinear, workpiece support frame in front of a robot or a group of robots. The robot or robots each carry a multi-functional unit. Each multi-functional unit is a carrier of a plurality of driven tools that protrude from the machining side of the multi-functional unit in a partially extendable manner. To process the workpieces, the robot or robots guide their multi-functional units toward the respective workpiece, in order to be pivoted away from the workpiece again after machining. If several robots are in use at the same time, the tools of several multi-functional units process the workpiece, wherein the multi-functional units are moved independently of each other. Thus, the machining station is a robot cell.

The disclosure proposes a plurality of transfer devices for connecting two or more route sections to form a closed route. For this purpose, the transfer devices have transfer sections that are attached to the ends of the route sections, in order to transport workpiece trolleys—individually or in groups—from one route section to another. Some of the transfer sections are shifted or relocated, as the case may be, between the route sections on predefined paths with the assistance of lever gears, screw gears or the like. The transfer sections can also be specially moved to form switches.

Of course, the transfer devices can also be used in a transport system on which special tool trolleys are moved actively or passively instead of the workpiece trolleys.

Further details of the invention arise from the claims and the following description of at least one schematically illustrated embodiment.

DETAILED DESCRIPTION

Figure 1:
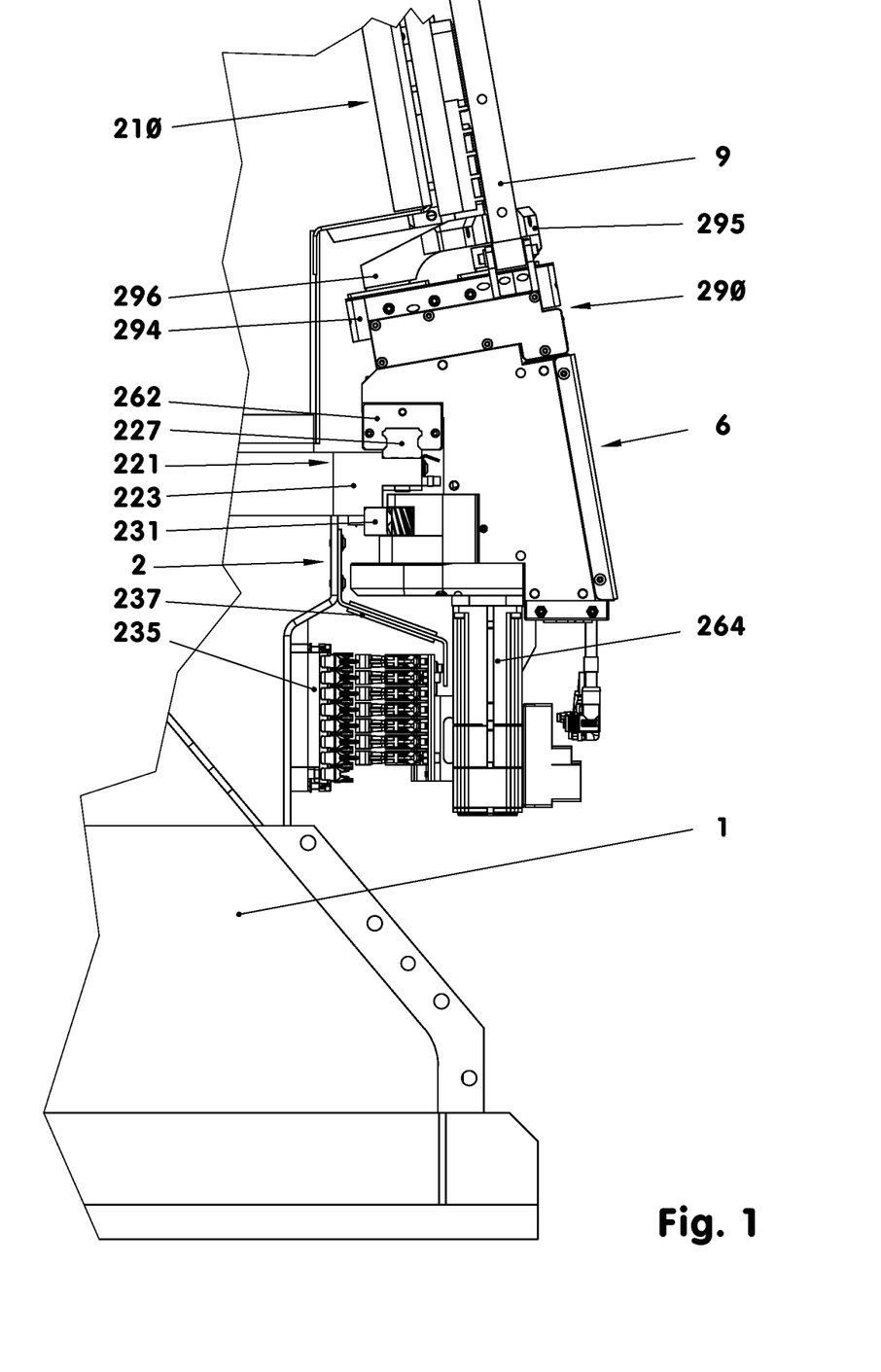
FIG. 1: End section view of a workpiece transport system.

FIG. 1 shows part of the front view of a machining station for machining plate-like and/or board-like workpieces (9). For this purpose, the machining station has, for example, a rectilinear elongated machine bed (1) on which a workpiece support frame (210) is mounted. A workpiece transport system (2) is arranged along the workpiece support frame (210). The latter consists, among other things, of two route sections or transport rails (221) laid, for example, in parallel, each of which ends at the end faces of the workpiece support frame (210). Self-propelling workpiece trolleys (6), which may be grouped together, move on the route sections located in front of the workpiece support frame (210) and transport the workpieces (9) forwards along the workpiece support frame (210). The workpiece trolleys (6) travel back on a route section located behind, above or below the workpiece support frame (210). The entire route is, for example, a rail system circling the workpiece support frame (210).

The rail system is mounted on a machine bed (1). A transport rail is fastened to the front and rear of the machine bed as a straight route section. The rear transport rail is not shown here. The single transport rail (221) consists of a rigid support bracket (223), a support rail (227) and a toothed rack (231). In this case, the support rail (227) sits on the support bracket (223), while the toothed rack (231) is fastened in the lower region of the support bracket (223). Mounted on the machine bed below the toothed rack (231) are a multi-conductor current and multi-conductor signal rail (235). The latter is covered in the upper region with the aid of a power rail cover (237). Along the machine bed (1), for each side, the support bracket (223), the transport rail (221, 222), the toothed rack (231) and the multi-conductor current and multi-conductor signal rail (235) can be composed of many individual pieces.

In the exemplary embodiment, both transport rails are of equal length and oriented parallel to each other. Their upper edges also lie in a common horizontal plane. Two transport rails terminate at the same height at each machine bed end.

The workpiece support frame (210) is used, for example, to support the plate-shaped or board-shaped workpieces, which are made, for example, of materials such as wood, chipboard, plasterboard, fiber cement or the like. Such materials also include composites and aluminum alloys.

Figure 2:
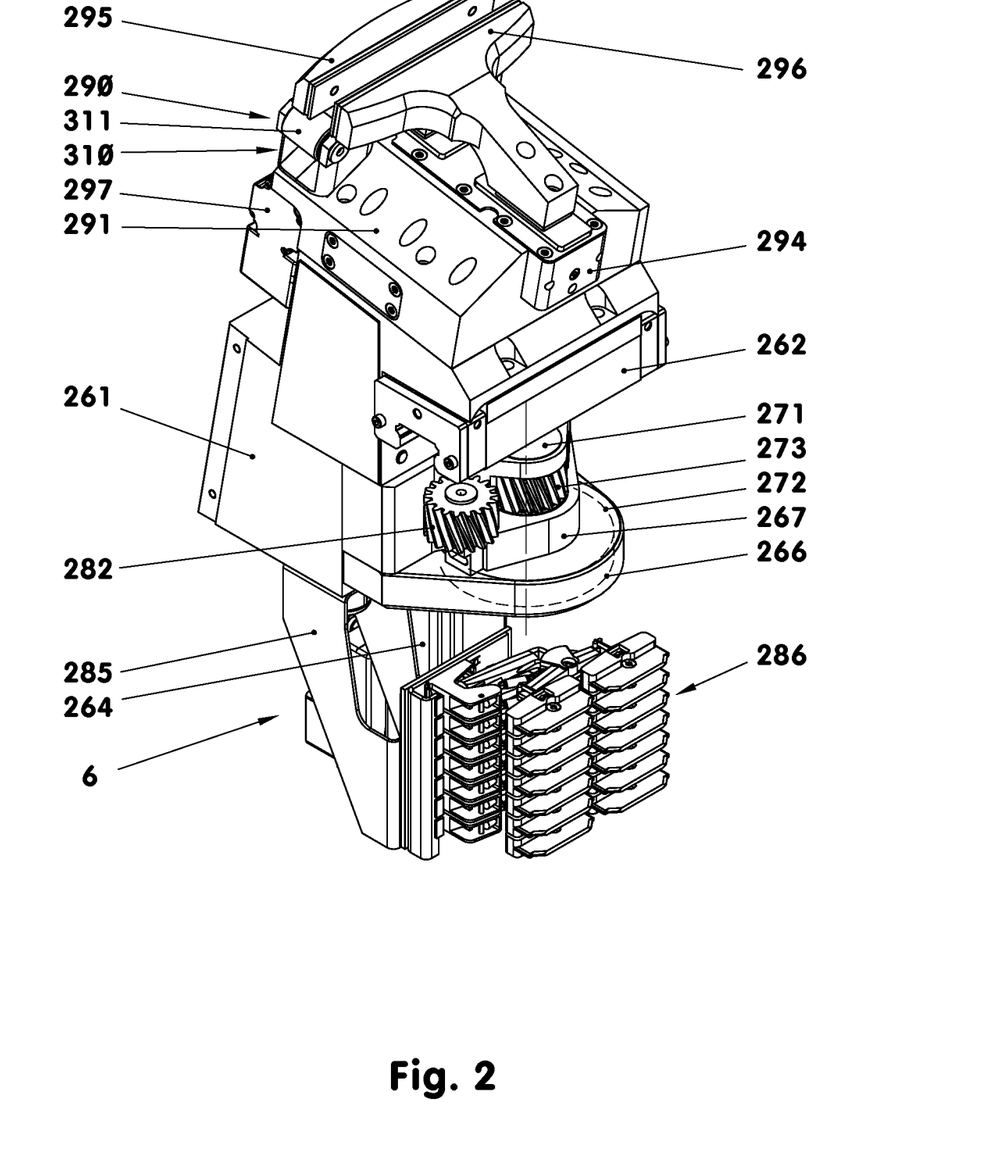
FIG. 2: Perspective view of a workpiece trolley from diagonally behind.

FIG. 2 shows the rear side of a workpiece trolley (6). The central component of the workpiece trolley (6) is the angularly shaped base body (261). A guide carriage (262) is arranged below the projection of the base body (261). The guide carriage (262) is, for example, a recirculating ball bearing unit, which encompasses the support rails (227) in the vertical directions and in the lateral directions with rolling bearings. An auxiliary shaft (271), which carries the helically toothed output gear (273), is located below the guide trolley (262). The auxiliary shaft (271), which is mounted in rolling bearings in a bearing block (267), has a drive gear (272)—shown in dashed lines—that is enclosed on the out-side by a gear housing (266) formed on the base body (261). A downwardly projecting servomotor (264) with a possibly integrated gear unit is arranged below the gear housing (266). A straight-toothed pinion gear—not shown here—that meshes with the drive gear (272) of the auxiliary shaft (271), sits on the shaft of the servomotor (264).

A downwardly projecting collector cantilever (285), a sheet metal component, is arranged on the lower side of the base body (261) adjacent to the servomotor (264). The current and signal collectors (286) are spring-mounted on it. In the present case, seven collectors (286) are used. The upper one is connected to ground, for example. The next two current collectors (286) carry +48 V and −48 V at, for example, 10 A current. The fourth and fifth collectors are each a current collector (286) for +24 V and −24 V at 5 A current. The two lower collectors (286) are signal collectors for the CAN bus used here, for example.

In accordance with FIG. 2, a collet chuck (290), which can be actuated, for example electromechanically, is seated on the base body (261) of the workpiece carriage (6). A slide with two sliding gate recesses is arranged in the chuck housing (291). The slide—not shown here—is moved by an electrically driven sliding gate drive—with the servomotor (297)—to open and close the collet chuck (290). Each sliding gate recess has a different pitch.

Above the slide, two carriages are seated transverse to the guide carriage (262) one behind the other in the chuck housing (291), of which only the rear guide carriage (294) is visible here. Each carriage is connected by a pin to one of the sliding gate recesses of the slide. In addition, each carriage carries a gripping element on its upper side (295, 296). The gripping element (296), which is arranged at the front in FIG. 2, rests against the rear side of the plate-shaped workpiece (9) through only a short lift. For this purpose, the sliding gate recess located under the carriage (294) has only a small pitch. The gripping element (295), which is located at the rear here, has the task not only of gripping a workpiece (9) placed on the workpiece carriage (6), but also of pulling it against the workpiece support frame (10) and the gripping element (296). A large lift is required for this purpose. Thus, the sliding gate recess in the carriage has a large pitch here.

The collet chuck (290) has a bearing block (310) below each of the lateral projections of the gripping elements (295, 296). Each bearing block (310) has, for example, two adjacent rollers. Such rollers take the workpiece load.

Since the individual workpiece trolleys (6) are to travel practically in a circle around the workpiece support frame (210) within the workpiece transport system (2), the workpiece trolleys (6) must be transferred both from the front transport rail (221) to the rear transport rail and vice versa. For this purpose, for example, two turntables are used, which are arranged at the end faces of the workpiece support frame (210) at the height of the transport rails. During each transfer process, the turntable—as a horizontal turntable transfer unit—rotates 180 degrees around its pivot axis, which is vertical in this case.

Figure 3:
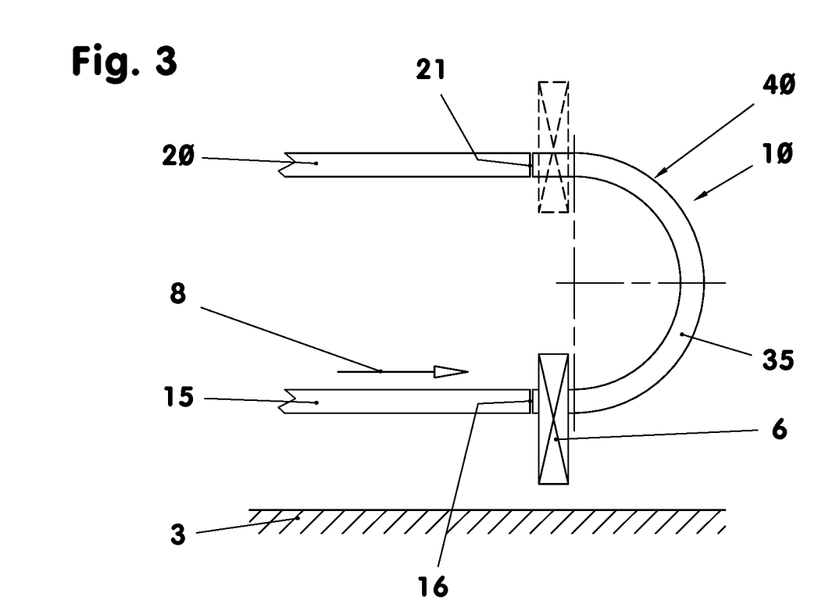
FIG. 3: Partial side view of a route with a half-oval transfer unit.
Figure 4:
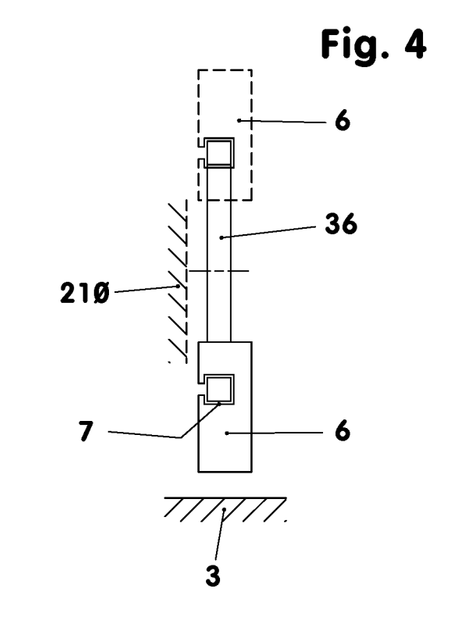
FIG. 4: Front view of the half-oval transfer unit of FIG. 3 with a direction of view to the outside.
Figure 5:
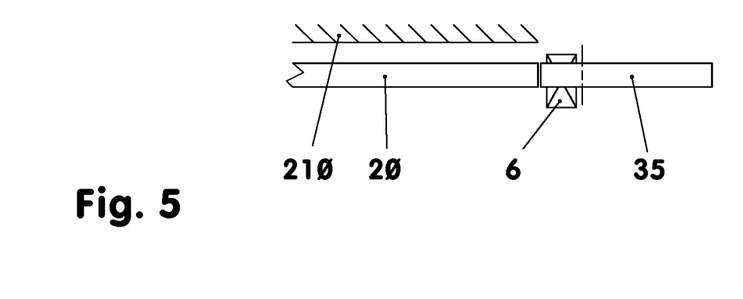
FIG. 5: Top view of FIG. 3.

In contrast, FIGS. 3 to 5 show a half-oval transfer unit (40) rigidly connecting two straight route sections (15, 20) in the region of the rear end of the workpiece support frame (210). For this purpose, FIGS. 3 to 36 show the route known from FIG. 1—in the form of a profiled support rail (227)—in cross-section as a rectangle. In FIGS. 3 to 36, the workpiece trolley (6) of FIGS. 1 and 2 takes the form of an elongated cuboid, which has a gripping recess (7) above its vertical center for support on the route (10).

Figure 6:
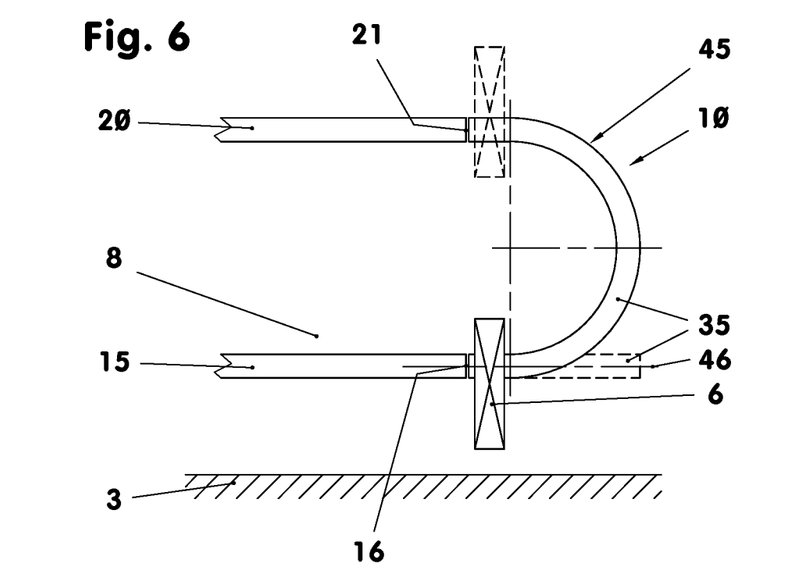
FIG. 6: Partial side view of a route with a half-oval turnout.

The lower, floor-level route section (15), see FIG. 6, is the forward route of the transport route section on which the workpiece trolleys (6) guide the workpieces (9) along the front side of the workpiece support frame (210). For example, the route section (20) that, as a reverse route, guides the unloaded transport carriages (6), for example, into the region of the front end of the workpiece support frame (210), is located vertically above this. Thereby, the profile of the upper route section (20) is rotated by 180 degrees relative to the lower route section (15), such that the returning transport carriages (6)—shown in dashed lines—are upside down there. The end faces of the two ends (16, 21) of the route sections (15, 20), for example, lie in one plane.

The half-oval transfer section (40) can be, for example, a transfer section (35) in the form of a rail bent into a semicircle. In the present case, however, it is a rail whose semicircle is adjoined at each end face by a straight section that has, for example, a length that corresponds to one to two times the width of the transport carriage (6). Due to the straight section in front of the returning route section (20), the rail joint—that is, the transition between the transfer section (35) and the route section (20)—is not loaded by the centrifugal acceleration of the transport carriage (6).

The front view, in accordance with FIG. 4, shows the transfer section (35) located behind the workpiece support frame (210). FIG. 5 shows the top view with the route sections (15, 20) in front of the workpiece support frame (210). The transfer section (35) is located outside the end face of the workpiece support frame (210).

This variant allows a closed route (10) with a small installation space, on which the workpiece trolleys (6) can move continuously. A transfer drive is not required here.

Figure 7:
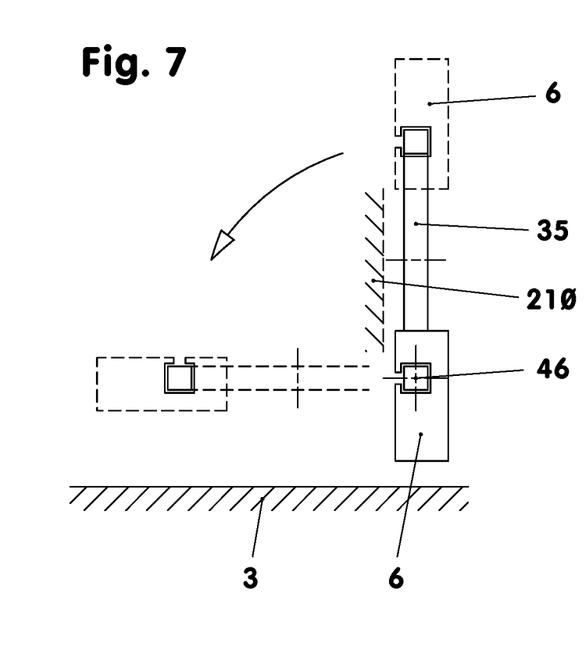
FIG. 7: Front view of the half-oval switch shown in FIG. 6 with a direction of view to the outside.
Figure 8:
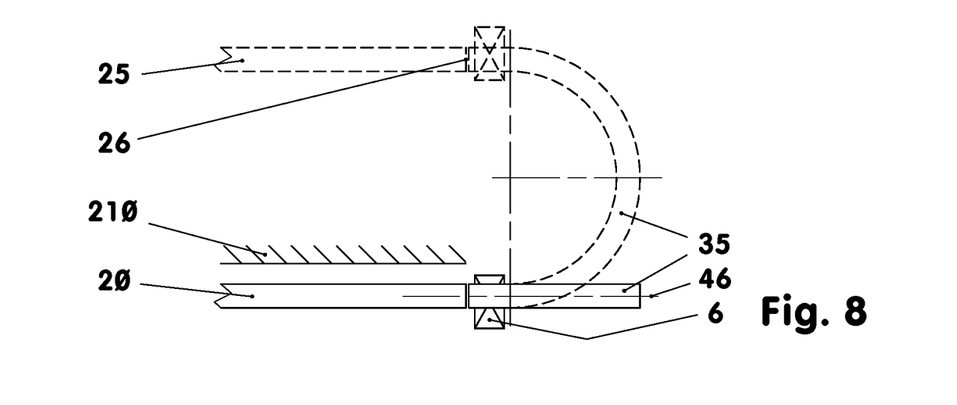
FIG. 8: Top view of FIG. 6.

FIGS. 6 to 7 show a half-oval switch (45) as a transfer device. As in the variant according to FIGS. 3 to 5, the entire route (10) consists of two, for example straight, route sections (15, 20), two semi-oval transfer sections (35) and a further, for example straight, route section (25). The four sections (15, 20, 35) form an oval located, for example, in a vertical plane.

With the new variant, see FIGS. 6 and 7, the added route section (25) is located behind the front, lower route section (15). The new route section (25) and the upper route section (20) are equidistant from the route section (15). The route sections (15) and (25) lie, for example, in a plane parallel to the contact surface (3). In addition, for example, each of the two semi-oval transfer sections (35) is mounted at one of the two ends of the front, lower route section (15) so that it can pivot about a pivot axis (46). This pivot axis (46) is, for example, parallel or congruent with the center line of the straight route section (15).

The workpiece trolleys (6) moving forward on the route section (15) can now be diverted either to the upper route section (20) or to the rear route section (25) by swiveling the rear transfer section (35). If both transfer sections (35) are pivoted upward, the result is a route that is known from FIGS. 3 to 5. If the two transfer sections (35) are pivoted downward, such that their center lines are parallel to the contact surface (3), the workpiece trolleys (6) travel—without a front stand—on a horizontal oval. Here, for example, one of the route sections (20) or (25) can be used as a secondary, side or spur track. Maintenance work can be carried out on the workpiece trolley (6) there if necessary.

Here, a closed route (10) with at least one branch is shown in a small installation space, on which the workpiece trolleys can move continuously—at least if both transfer sections (35) lie in one plane. One transfer drive each swivels a transfer section (35) for this purpose.

FIGS. 9 to 12 show a transfer device in the form of a linear lift transfer unit (50). In accordance with FIGS. 9 to 11, a lifting frame (51) is arranged in the region of the ends (16, 21) of the route sections (15, 20), with which a threaded spindle (52) moves a lifting carriage (53) with an integrated spindle nut up and down or back and forth between two positions. The lifting carriage (53) carries a short, straight transfer section (36) as part of the route (10). The transfer section (36) and the lifting carriage (53) move along a straight path (54) during the transfer process.

Figures 9, 11:
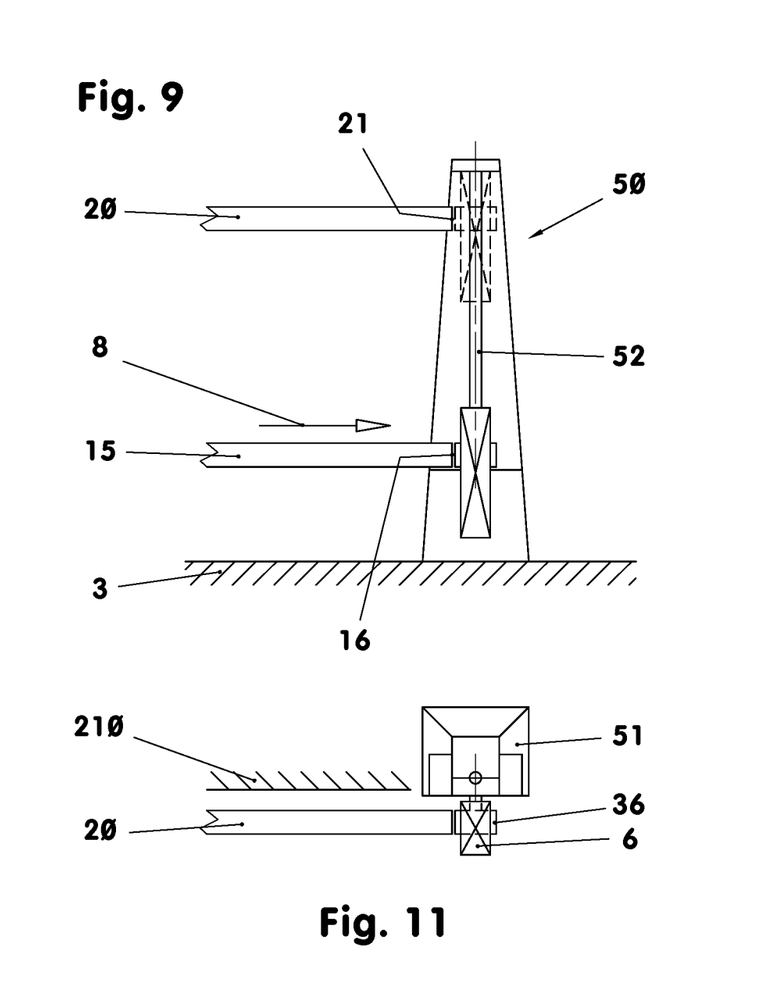
FIG. 9: Partial side view of a route with a linear lift transfer unit.
FIG. 11: Top view of FIG. 9.
Figure 10:
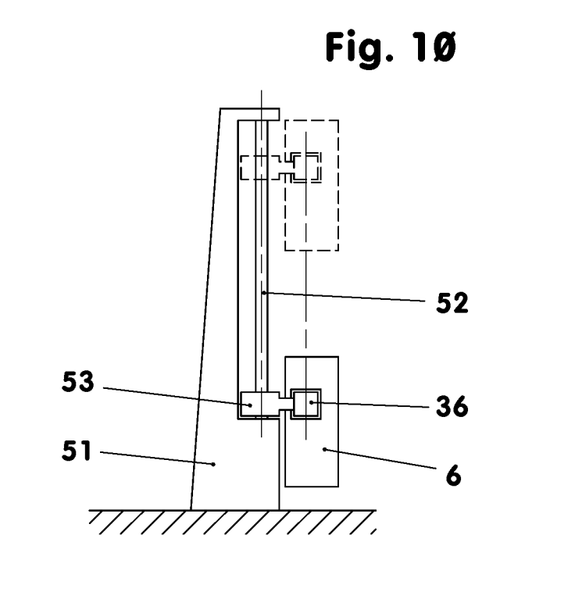
FIG. 10: Front view of linear lift transfer unit shown in FIG. 9 with a direction of view to the outside.

According to FIG. 9, the transfer section (36) is located in front of the end (16) of the route section (15) in its extension. Thereby, according to FIG. 11, the lifting frame (51), in which the drive for the threaded spindle (52) or the screw drive, as the case may be, is accommodated, is arranged behind the workpiece support frame (210) and next to the lower route section (15) in the forward direction (8) of travel of the workpiece carrier (6).

Figure 12:
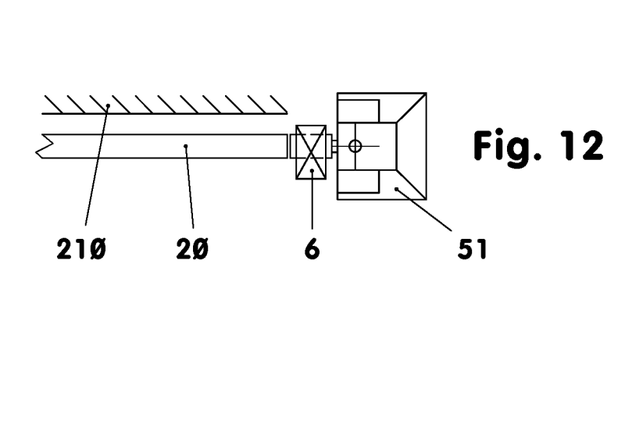
FIG. 12: Top view of FIG. 9, but with a linear lift transfer unit arranged at the end side of straight route sections.

In accordance with FIG. 12, the lifting frame (51) is alternatively positioned directly in front of the ends (16, 27) of the route sections (15, 20). This enables shorter route sections (15, 20).

FIGS. 13 to 18 show a lift switch transfer unit (55). It differs from the linear lift transfer unit (50) in that it has at least one intermediate stop position between two end positions of the lift of the threaded spindle (52). The lift switch transfer unit (55) acts like a switch. A workpiece trolley arriving on the route section (15) is diverted to either the route section (20) or the route section (30).

In the example shown in FIGS. 13 to 16, for example, a further route section (30) is located in the middle between the route sections (15) and (20). According to FIGS. 13 and 14, the workpiece trolley (6)—parked on the transfer section (36)—is located in front of the end of the route section (31). From there, the workpiece trolley (6) can easily drive onto the route section (30). In accordance with FIGS. 15 and 16, the lifting carriage (53) has been moved to the upper holding position by means of the threaded spindle (52), such that the workpiece carriage (6) is located directly in front of the route section (20).

Figure 13:
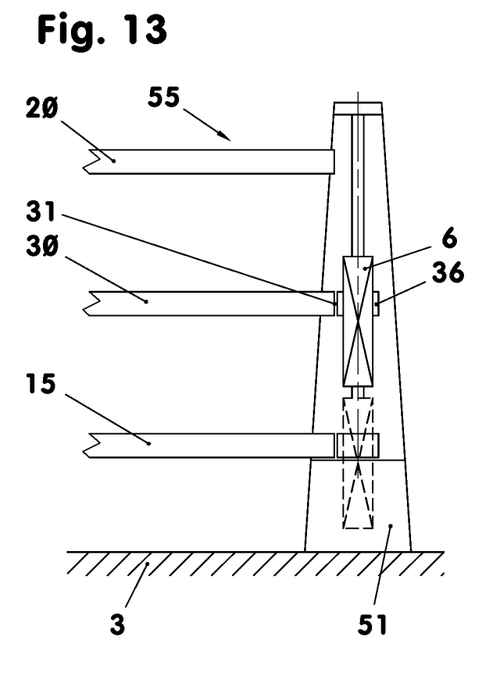
FIG. 13: Partial side view of a route with three straight route sections, wherein the middle is being controlled.
Figure 14:
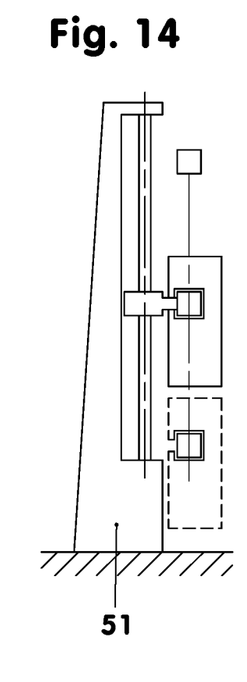
FIG. 14: Front view of the lift switch transfer unit from FIG. 13 with a direction of view to the outside.
Figure 15:
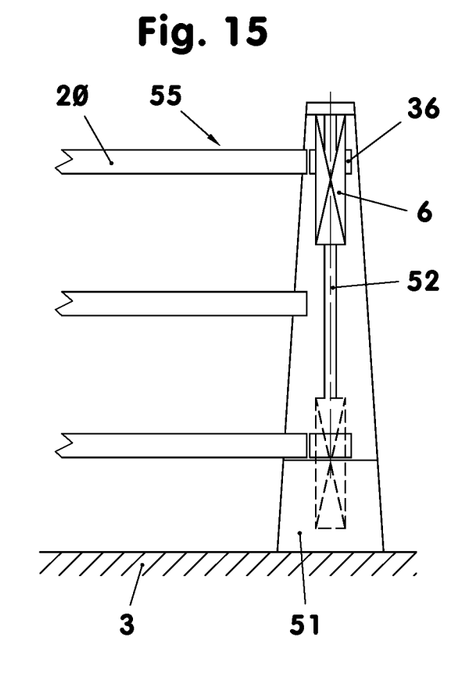
FIG. 15: As FIG. 13, but the upper route section is controlled.
Figure 16:
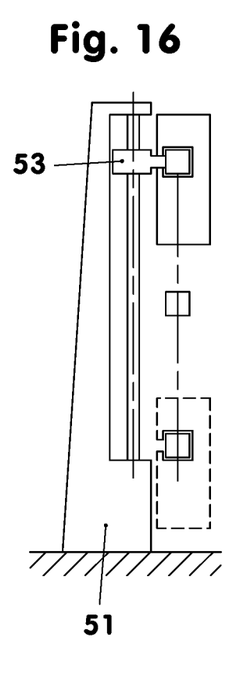
FIG. 16: Front view of the lift switch transfer unit from FIG. 15 with a direction of view to the outside.
Figure 17:
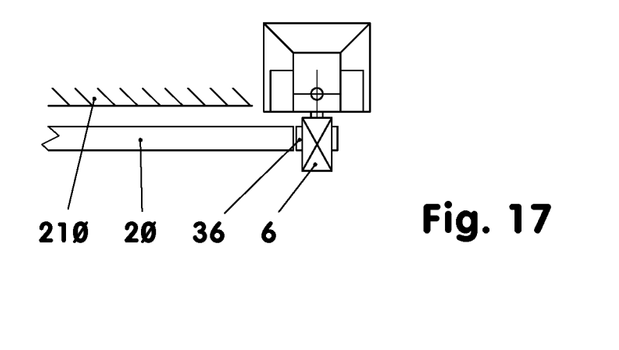
FIG. 17: Top view of FIGS. 13 and 15.
Figure 18:
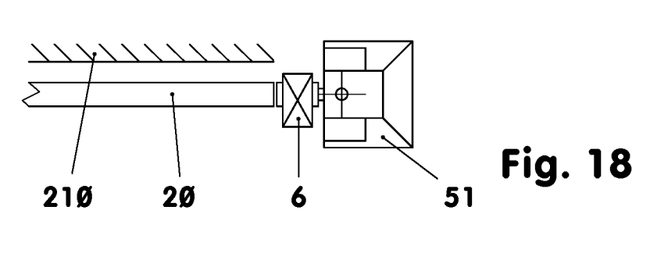
FIG. 18: Top view of FIGS. 13 and 15, but with lift switch transfer units arranged at the end face of straight route sections.

FIG. 17 shows a top view of the variant according to FIG. 13. In accordance with FIG. 18, the lifting frame (51) is alternatively positioned in front of the ends (16, 21, 31) of the route sections (15, 20, 30).

Figure 19:
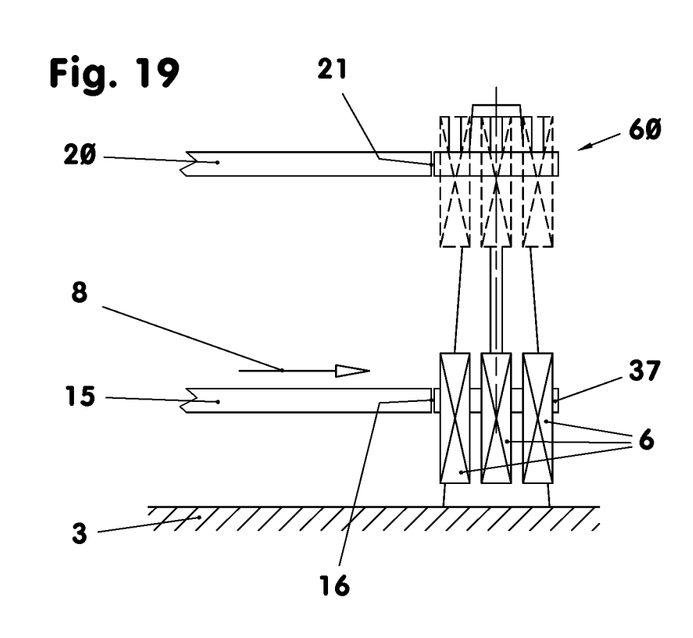
FIG. 19: Partial side view of a route with a carriage group transfer unit with a long transfer section.
Figure 20:
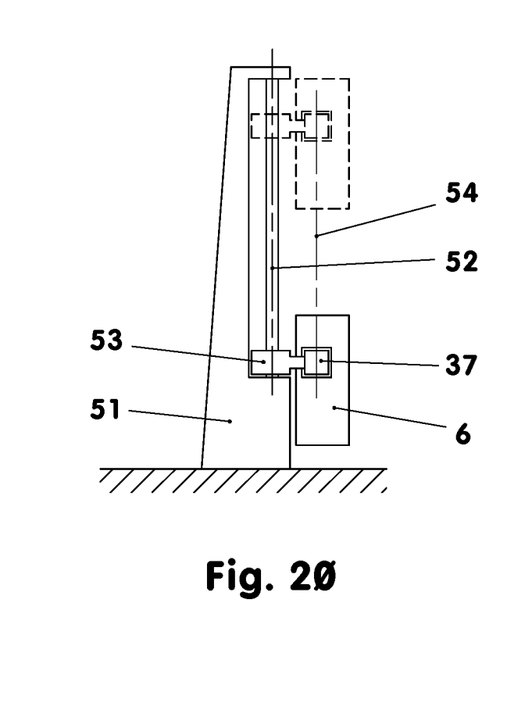
FIG. 20: Front view of the trolley group transfer unit from FIG. 19 with a direction of view to the outside.
Figure 21:
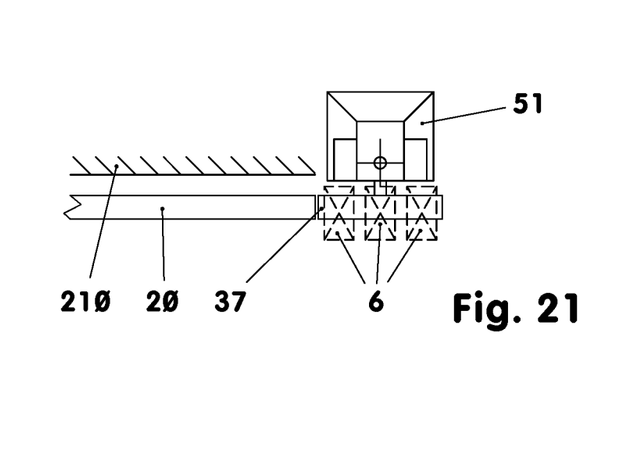
FIG. 21: Top view of FIG. 19.

FIGS. 19 to 21 show a trolley group transfer unit (60), with which, in contrast to the linear lift transfer unit (50) shown in FIGS. 9 to 12, the straight, short transfer section (36) there is replaced by a straight, long transfer section (37). Two or more workpiece trolleys (6) can be lined up one behind the other on the transfer section (37), in order to be able to transfer them together by means of the lifting carriage (53), for example from the route section (15) to the route section (20). In the exemplary embodiment, the transfer section (37) provides space for three workpiece trolleys (6). FIG. 19 shows a partial side view of the carriage group transfer unit (60), FIG. 20 its front view and FIG. 21 its top view.

A double-track lift transfer unit (65) can be seen in FIGS. 22 to 25. With this variant, the workpiece trolley (66), shown here only in outline, is supported on a double-track route section (17, 22), in order to provide a more stable support base for carrying heavier loads. On such route sections (17, 22), the workpiece trolleys (66) should also carry loads that have an off-center center of gravity.

Each route section (17, 22) has two adjacent profiled rails, the mutual spacing of which is at least as great as the width of the profiled rails themselves. Both profile rails lie in one plane, which is aligned, for example, parallel to the contact surface (3).

Figure 23:
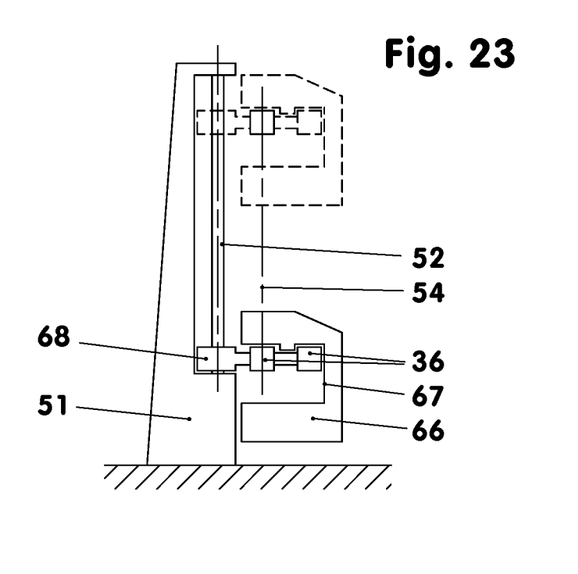
FIG. 23: Front view of the double-track lift transfer unit from FIG. 22 with a direction of view to the outside.

The workpiece trolley (66) has a gripping recess (67) with which it grips around the supporting route section (17, 22), for example in a c-shape, see FIG. 23. An undercarriage is arranged in the gripping recess (67), with which the workpiece trolley (66) is stably supported on the two profiles of the respective route section (17, 22) in all directions transverse to the direction of travel of the workpiece trolleys (66).

Figure 22:
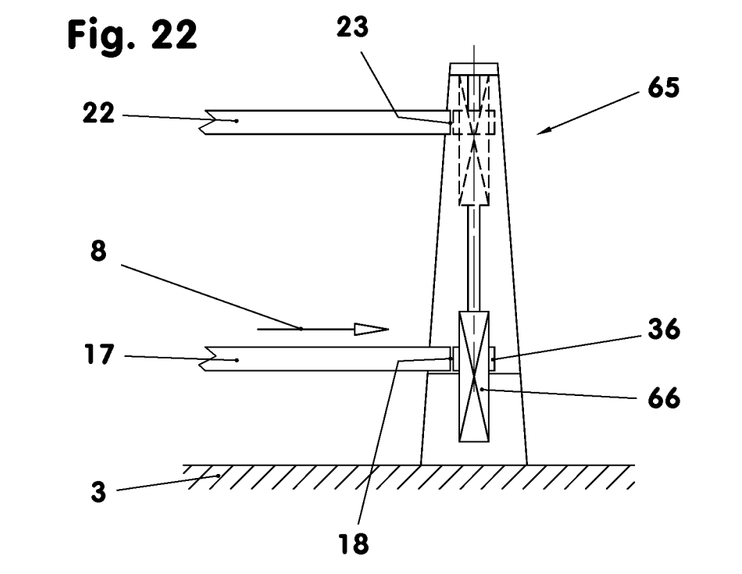
FIG. 22: Partial side view of a double-track route with a double-track lift transfer unit.

In the lifting frame (51), the threaded spindle (52) carries a lifting carriage (68), on which two straight, short transfer sections (36) are arranged parallel to each other. The transfer sections (36) have the same distance to each other as the two profiles of the respective route sections (17, 22).

Figure 24:
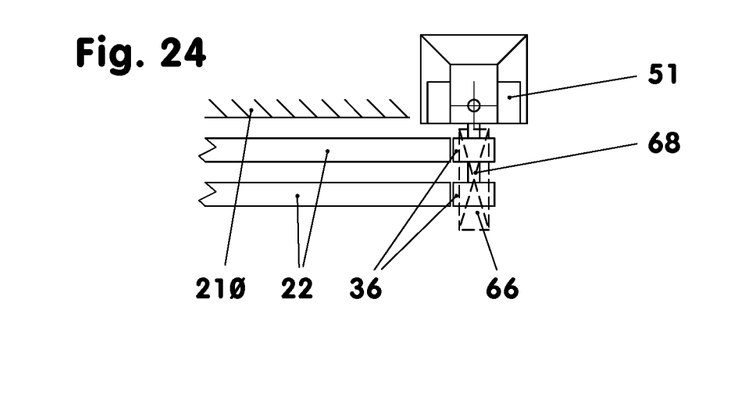
FIG. 24: Top view of FIG. 22.
Figure 25:
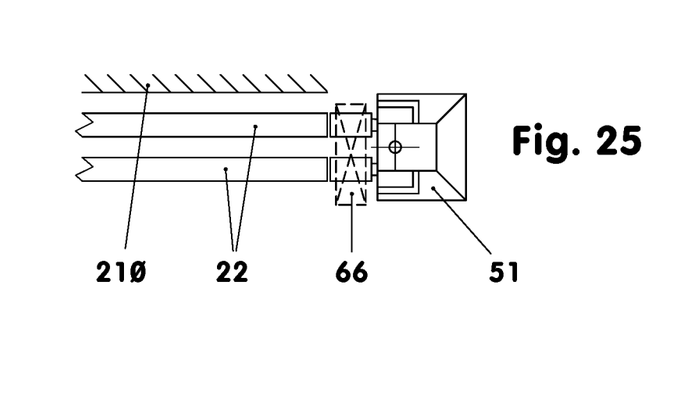
FIG. 25: Top view of FIG. 22, but with a double-track lift transfer unit arranged at the end face of straight route sections.

FIG. 24 shows a top view of the double-track lift transfer unit (65). According to FIG. 25, the lifting frame (51) is alternatively positioned in front of the ends (18) and (23) of the route sections (17) and (22).

Figure 26:
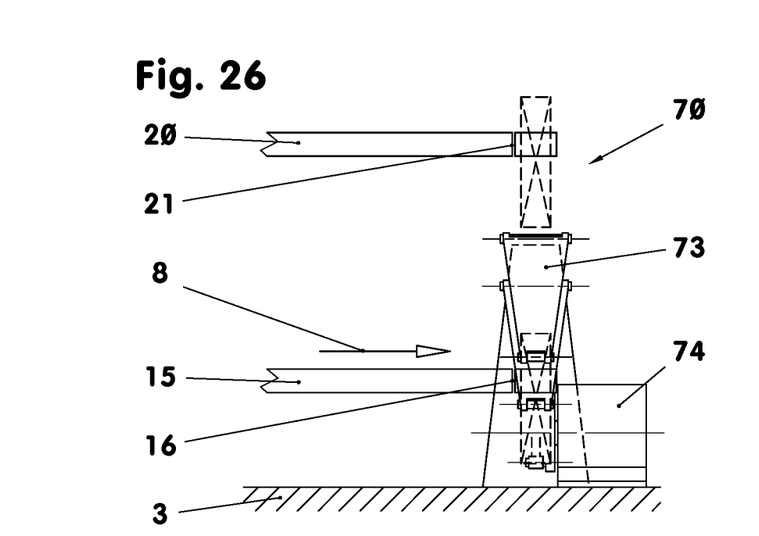
FIG. 26: Partial side view of a route with a parallelogram transfer unit.
Figure 27:
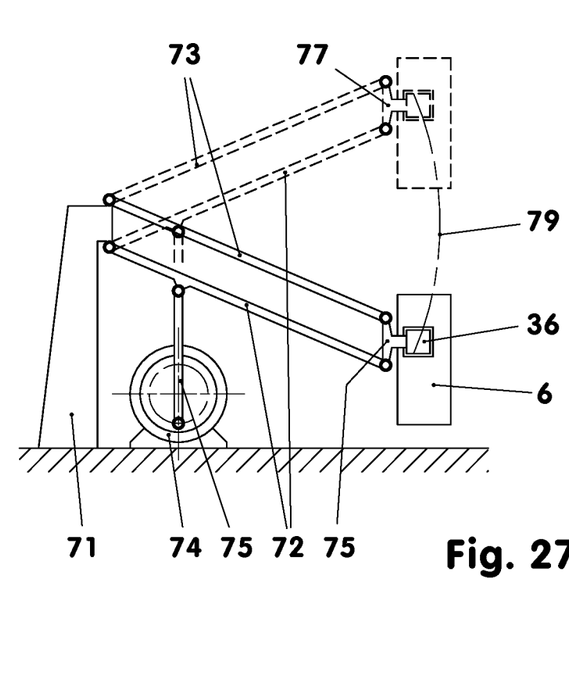
FIG. 27: Front view of the parallelogram transfer unit from FIG. 26 with a direction of view to the outside.
Figure 28:
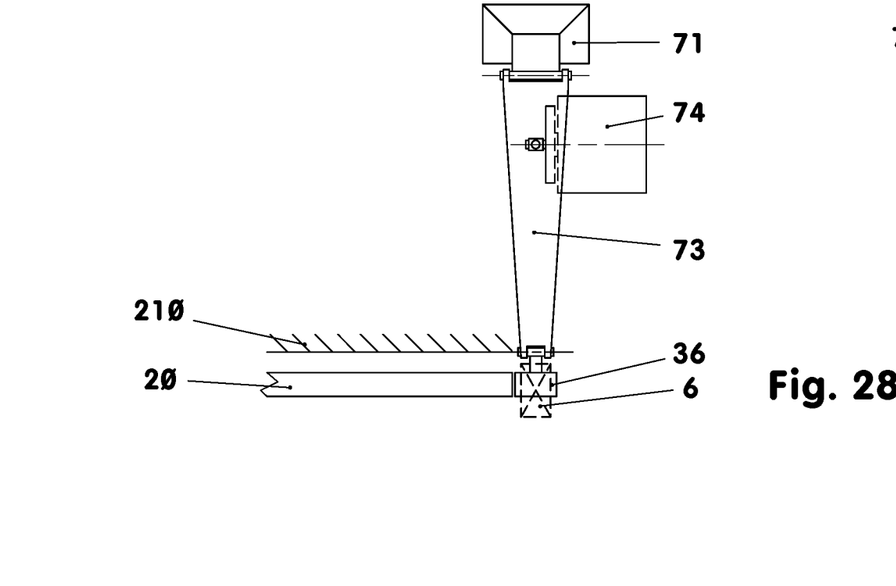
FIG. 28: Top view of FIG. 26.

FIGS. 26 to 28 illustrate a parallelogram transfer unit (70). The latter moves a cantilever (77), on which the transfer section (36) is arranged, for example, on an elliptical path (79) from the region of the route section (15) to the region of the route section (20) or vice versa. For this purpose, as shown in FIG. 28, a lifting frame (71) is fastened on the contact surface (3) behind the workpiece support frame (210). At the top end of the lifting frame (71), there are two hinge points at a distance of several centimeters or decimeters, each of which pivotally supports a, for example trapezoidal, swing arm (72, 73). The swing arms (72, 73) jointly support the cantilever (77) at their narrower end in the exemplary embodiment. Both swing arms are aligned parallel to each other—as parts of a lever or parallelogram gear unit. The pivot axes of all hinge points are oriented parallel to the contact surface (3), for example.

In order to move the cantilever (77) with the transfer section (36) back and forth between the ends (16) and (21) of the route sections (15) and (20), a drive (74) with an eccentric or a crank is positioned below the swing arm (72). A coupling rod (75) is pivotally attached to the eccentric or crank and hinged directly to the underside of the swing arm (72). In order to now move the transfer section (36)—with the workpiece trolley (6) parked on it—up or down between the ends (16) and (21), the drive (74) with its eccentric or crank gear unit requires, for example, only one direction of rotation.

Figure 31:
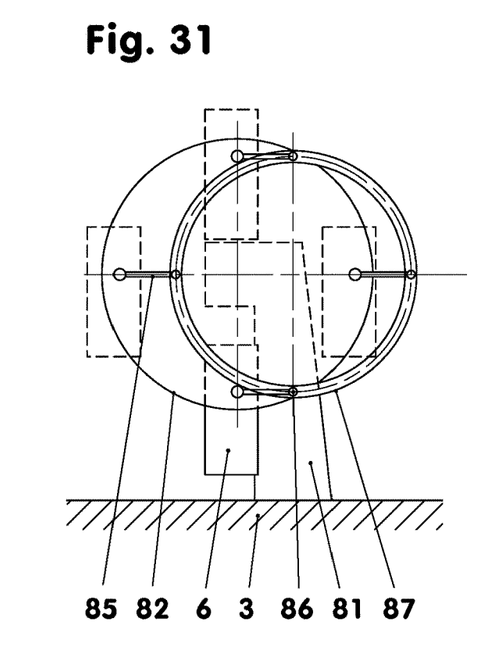
FIG. 31: Front view of the front turntable transfer unit from FIG. 29 with a direction of view to the outside.
Figure 32:
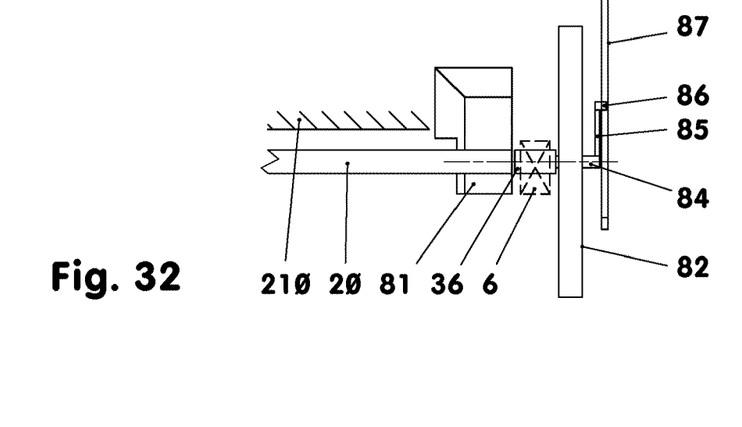
FIG. 32: Top view of FIG. 29.
Figure 33:
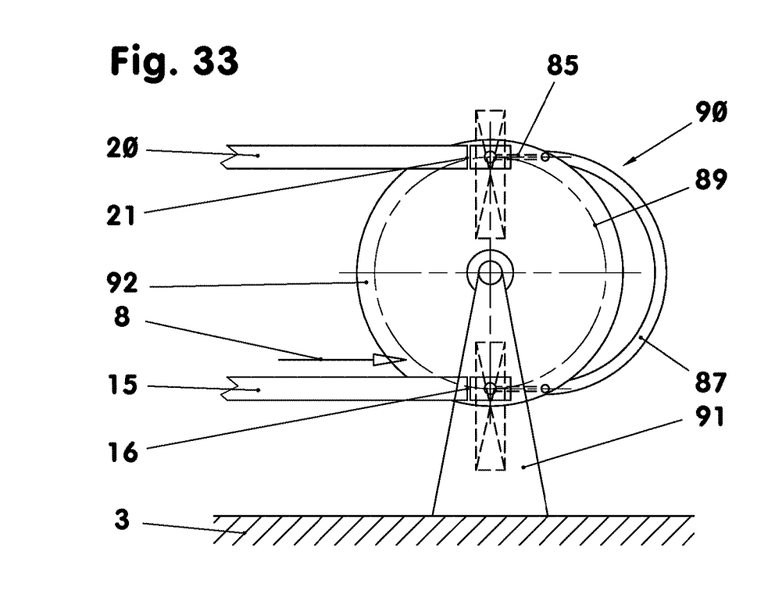
FIG. 33: Partial side view of a route with a lift turntable transfer unit.
Figure 34:
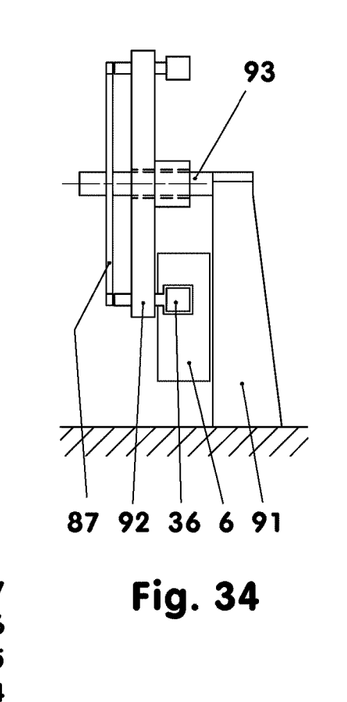
FIG. 34: Front view of the lift turntable transfer unit from FIG. 33 upon the acceptance of the workpiece carriage with a direction of view to the outside.
Figure 35:
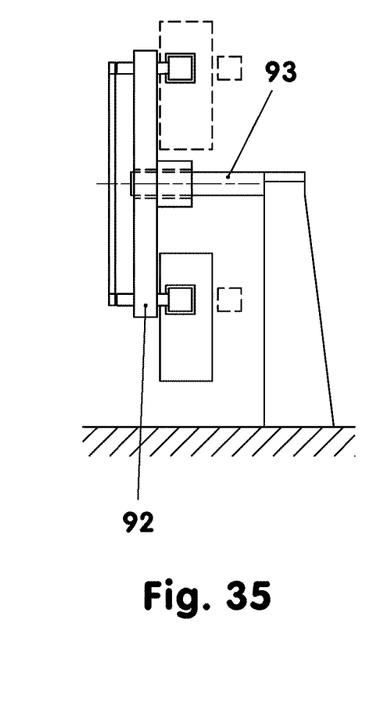
FIG. 35: As in FIG. 34, but after the workpiece carriage has been accepted and prior to the transfer.
Figure 36:
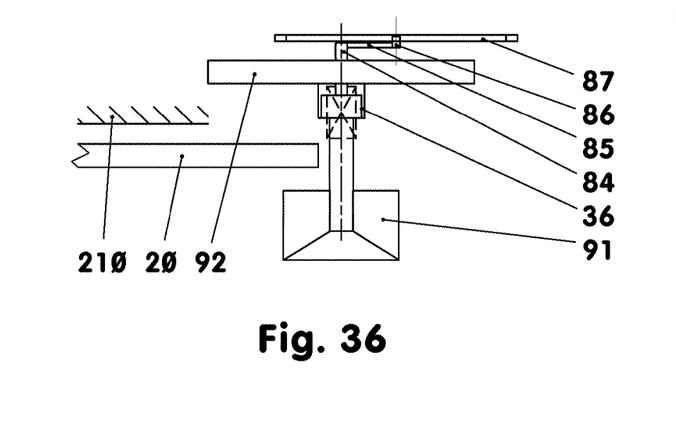
FIG. 36: Top view of FIG. 33.

A front turntable transfer unit (80) is shown in FIGS. 31 to 32. Such transfer unit (80) has a front turntable (82), which is arranged in front of the ends of the end faces (16, 21) of the route sections (15, 20). The front turntable (82) has a center line, which is positioned, for example, in the middle between the center lines of the route sections (15, 20). Thus, all three center lines lie in one plane. The distance between the front turntable (82) and the ends of the end faces (16, 21) is several millimeters greater than the length of the transfer section (36) carrying a workpiece trolley (6).

Figure 29:
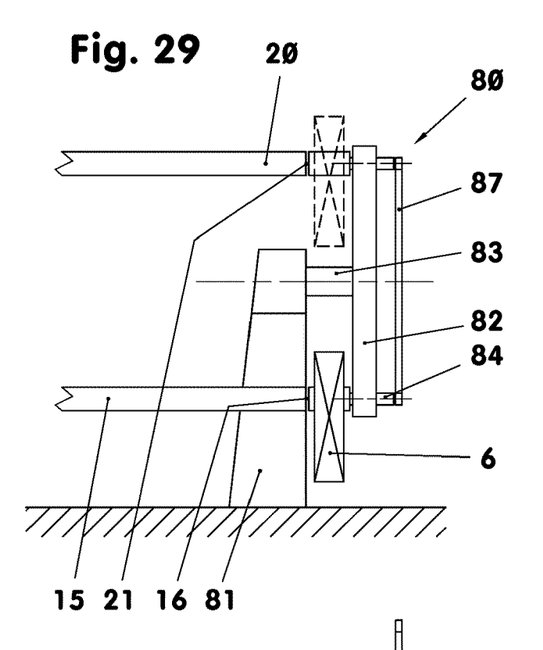
FIG. 29: Partial side view of a route with a front turntable transfer unit.
Figure 30:
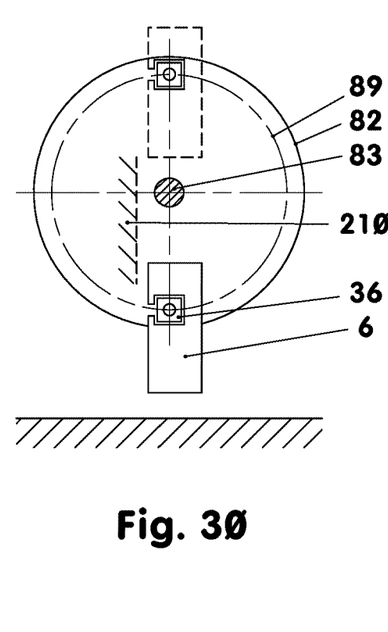
FIG. 30: Front view of the front turntable transfer unit from FIG. 29 with a direction of view to the outside.

The front turntable (82) is mounted via a disk shaft (83) in a lifting frame (81), which also accommodates the drive for the disk shaft (83). The front face of the lifting frame (81), which is the right-hand side of the lifting frame (81) as shown in FIGS. 29 and 32, lies in the same plane as the end faces of the ends (16, 21), for example.

The transfer sections (36) positioned with slight play in front of the ends (16, 21) are rotatably mounted in the front turntable (82) via a bearing journal (84). The latter protrudes over the rear side of the front turntable (82), in order to support a control lever (85) there in a torsionally rigid manner on the bearing journal (84). The control lever (85) of each bearing journal (84) terminates in a control pin (86), which in turn engages a stationary guide slot (87). The bearing journal (84) and the control pin (86) have parallel center lines. The guide slot (87) is a control ring, in which an annular groove is incorporated, in which the free end of the control pin (86) engages with a small amount of play.

In the exemplary embodiment, the guide slot (87) is arranged in a manner stationary on the lifting frame (81), in such a way that the control levers (85) are aligned parallel to the contact surface (3) as shown in FIGS. 31 and 32.

To move the workpiece trolleys (6), the front turntable (82) is rotated, for example, by 180 angular degrees about its center line. To prevent the combination of transfer section (36) and workpiece trolley (6) from oscillating, the transfer section (36)—which is moved on a circular path (89)—is supported in the guide slot (87) via the bearing journal (84), the control lever (85) and its control pin (86) in such a way that the workpiece trolley (6) retains its orientation specified from the route section (15).

If the guide slot (87) is arranged laterally in a manner offset by the control lever length parallel to the contact surface (3)—or perpendicular to the plane defined by the center lines of the route sections (15) and (20)—as shown in FIG. 31, the pendulum angle of the workpiece trolley (6) is minimal or equal to zero with minimal play.

In a simplified—not shown—sub-variation, the front turntable (82) can be replaced by a pivoting lever, while omitting the slot guide (84-87). A transfer section (36) rigidly fastened to the free end of the lever pivots the workpiece trolley (6), for example from bottom to top, where it is then transferred in an overhead position to a correspondingly adapted route section (20) for an overhead return travel.

FIGS. 33 to 36 show a lift turntable transfer unit (90) with which the workpiece trolleys (6) are also conveyed along a circular path (89) from one route section (15; 20) to another route section (20; 15). However, the lift turntable (92) sits in a plane that is parallel to the plane spanned by the center lines of the route sections (15) and (20).

In order to allow the lift turntable (92) to rotate in only one direction instead of on oscillating movement, the lift turntable (92) is mounted for longitudinal displacement on the, for example hollow, disk shaft (93). In accordance with FIG. 34, the lift turntable (92) has been moved so close to the lifting frame (91) that the transfer section (36) is aligned with the route section (15). With the workpiece trolley (6) driven onto the transfer section (36), the lift turntable (92) and the guide slot (87) are moved away from the route section (15) and (20) on the disk shaft (93) to such an extent that, when the lift turntable (92) is turned, the workpiece trolley (6) does not contact the route sections (15, 20), see FIG. 35. Now the lift turntable (92) can convey the workpiece trolley (6) upward in front of the route section (20). After reaching the upper position, the lift turntable (92) and the guide link (87) are moved again in the direction of the lifting frame (91) until the transfer section (36) with the workpiece trolley (6) parked on it has arrived directly in front of the end (21) of the route section (20). The workpiece trolley (6) can now drive onto the route section (20).

To prevent overhead travel here as well, the guide gate (87) already known from the previous variant is arranged behind the lift turntable (92). The pivotable mounting of the transfer section (36) and the corresponding linkage with the assistance of the control lever (85) can be taken completely from the variant in accordance with FIGS. 29 to 32.

The guide slot (87) is fastened, for example, to an axle mounted in the hollow disk shaft (93), in order to be displaced together with the lift turntable (92) by means of the drive generating the lift of the lift turntable (92). The connection of the guide slot and the shaft are not shown here.

In the exemplary embodiments, the route sections are each located in pairs in a plane, wherein such planes are either parallel to the contact surface (3) or perpendicular to it. Of course, such planes can assume any angle relative to the contact surface (3).

It is also possible to combine within the transport system (2) one or more transfer devices (40, 45, 50, 55, 60, 70, 80, 90) with each other completely or partially.

LIST OF REFERENCE SIGNS

1 Machine bed
2 Workpiece transport system, single-rail transport system
3 Contact surface, floor
6 Workpiece trolley, transport trolley including the simplified illustration
7 Gripping recess
8 Forward travel direction from (6)
9 Workpiece, plate-like and/or board-like
10 Route, simplified illustration
15 Route section, front, bottom; route
16 End of route section, front, bottom
17 Route section, double-track, front, bottom; route
18 End of route section, double-track, front, bottom
20 Route section, front, top; route
21 End of route section, front, top
22 Route section, double-track, front, top; route
23 End of route section, double-track, front, top
25 Route section, rear; route
26 End of route section, rear
30 Route section, centered; route
31 End of route section, centered
35 Transfer section, curved; route
36 Transfer section, straight, short; route
37 Transfer section, straight, long; route
40 Semi-oval transfer unit, transfer unit; route
45 Semi-oval turnout, transfer device; route
46 Pivot axis from (35)
50 Linear lift transfer unit, transfer device; route
51 Lifting frame
52 Threaded spindle
53 Lifting carriage, short
54 Path, straight
55 Lift turnout transfer unit, transfer device; route
60 Carriage group transfer unit, transfer device; route
65 Double-track lift transfer unit, transfer device; route
66 Workpiece trolley
67 Gripping recess
68 Lifting carriage, long; for (17) and (22)
70 Parallelogram transfer unit, transfer device; route
71 Lifting frame
72 Swing arm, bottom
73 Swing arm, top
74 Drive
75 Coupling rod
77 Cantilever
79 Path, elliptical
80 Front turntable transfer unit, transfer unit; route
81 Lifting frame
82 Front turntable, turntable
83 Disk shaft
84 Bearing journal
85 Control lever
86 Control pin
87 Guide slot, control ring
89 Path, circular curve
90 Lift turntable transfer unit, transfer unit; route
91 Lifting frame
92 Lift turntable, turntable
93 Disk shaft, hollow
210 Workpiece support frame
221 Transport rail, rail
223 Support bracket
227 Support rails
231 Toothed racks
235 Multi-conductor current and multi-conductor signal rails
237 Power rail cover
261 Base body, angular
262 Guide carriage, recirculating ball bearing unit
264 Drive unit from (6), servomotor Motor, if applicable with integrated gear unit
266 Gear housing, plate-shaped
267 Bearing block with two rolling bearings
271 Drive shaft, auxiliary shaft
272 Drive gear, large, bottom
273 Output gear, small, top
282 Lubrication wheel, felt gear
285 Collector cantilever, sheet metal component
286 Current and signal collectors, springing; collectors
290 Collet chuck
291 Chuck housing
294 Carriages
295, 296 Gripping elements
297 Drive unit, sliding gate drive, servo motor, gear motor
310 Bearing blocks
311 Rollers

The invention claimed is:

1. A transfer device for self-propelling workpiece trolleys (6) of a transport system (2), in which ends (16, 21, 26, 31) of route sections (15, 20, 25, 30) are intermittently connected, comprising:
a movable transfer section (36, 37) which is movable along a straight or curved path (54, 89) and which supports one or more workpiece trolleys (6), configured to be temporarily arranged in front of the ends (16, 21, 26, 31) of the route sections (15, 20, 25, 30), the movable transfer section being moved back and forth between the ends (16, 21, 26, 31) via a driveable gear unit.

2. A pair of transfer devices according to claim 1, arranged to form a closed rail system.

3. The transfer device according to claim 1, wherein the ends (16, 18, 21, 23, 26, 31) of the route sections (15, 20, 25, 30) lie in a common plane that is intersected perpendicularly by center lines of the route sections (15, 20, 25, 30).

4. The transfer device according to claim 1, wherein the path (54, 89) is a straight line or a curve that is curved in a plane or in space.

5. The transfer device according to claim 1, wherein the movable transfer section (36, 37) is arranged to be movable on a straight path (54) by a lifting carriage (53, 68).

6. The transfer device according to claim 5,
wherein at least one workpiece trolley (6, 66) can be temporarily parked on the movable transfer section (36, 37) arranged on the lifting carriage (53, 68).

7. The transfer device according to claim 1,
wherein the movable transfer section (36, 37) is pivotably mounted on a lifting frame (71) directly or via a cantilever (77) by a parallelogram gear unit (72, 73).

8. The transfer device according to claim 1,
wherein the movable transfer section (36, 37) is pivotably mounted on a turntable (82, 92), and
wherein an axis of rotation of the turntable (82, 92) is arranged parallel to a contact surface (3) of the transfer device (80, 90).

9. The transfer device according to claim 8,
wherein the turntable (82, 92) can be driven in only one direction of rotation.

10. The transfer device according to claim 8,
wherein the turntable (92) is linearly displaceable along its center line in addition to a rotational movement.

11. A transfer device for self-propelling workpiece trolleys (6) of a transport system (2), in which ends (16, 21, 26, 31) of route sections (15, 20, 25, 30) are continuously connected, comprising:
curved transfer sections (35) that are rigid and bent at least in sections and arranged to connect ends (16, 21, 26, 31) of the route sections (15, 20, 25, 30),
wherein one of the route sections (15, 20, 25, 30) is an upper route section (15) and another of the route sections (15, 20, 25, 30) is a lower route section (20),
wherein the self-propelling workpiece trolleys (6) are in a right side up orientation when traveling on the upper route section (20),
wherein the self-propelling workpiece trolleys (6) are in an upside down orientation when traveling on the lower route section (20),
wherein at least one of the curved transfer sections (35) is arranged pivotally about a pivot axis (46) at at least one end on one of the route sections (15, 20, 25), and
wherein the pivot axis (46) is arranged at least parallel to one of the route sections (15, 20, 25).

* * * * *